US012677846B2

(12) United States Patent
Shastri

(10) Patent No.: US 12,677,846 B2
(45) Date of Patent: Jul. 14, 2026

(54) SYSTEMS AND METHODS FOR CREATING BEVERAGES

(71) Applicant: Venkatram Prasad Shastri, Nashville, TN (US)

(72) Inventor: Venkatram Prasad Shastri, Nashville, TN (US)

( * ) Notice: Subject to any disclaimer, the term of this patent is extended or adjusted under 35 U.S.C. 154(b) by 624 days.

(21) Appl. No.: 18/011,564

(22) PCT Filed: Jun. 29, 2021

(86) PCT No.: PCT/US2021/039476
§ 371 (c)(1),
(2) Date: Jun. 21, 2023

(87) PCT Pub. No.: WO2022/006025
PCT Pub. Date: Jan. 6, 2022

(65) Prior Publication Data
US 2023/0232858 A1 Jul. 27, 2023

Related U.S. Application Data

(60) Provisional application No. 63/046,339, filed on Jun. 30, 2020.

(51) Int. Cl.
| | |
|---|---|
| *A23L 2/04* | (2006.01) |
| *A23G 9/04* | (2006.01) |
| *A23G 9/52* | (2006.01) |
| *A23L 2/395* | (2006.01) |
| *A23L 2/40* | (2006.01) |
| *A23L 2/56* | (2006.01) |
| *A23L 2/60* | (2006.01) |

(52) U.S. Cl.
CPC .............. *A23G 9/045* (2013.01); *A23G 9/52* (2013.01); *A23L 2/04* (2013.01); *A23L 2/395* (2013.01); *A23L 2/40* (2013.01); *A23L 2/56* (2013.01); *A23L 2/60* (2013.01)

(58) Field of Classification Search
CPC ............ A23G 9/045; A23L 2/04; A23L 2/395
See application file for complete search history.

(56) References Cited

U.S. PATENT DOCUMENTS

| | | | |
|---|---|---|---|
| 2007/0248736 A1* | 10/2007 | Masuda ................... | A23G 9/32 |
| | | | 426/592 |
| 2009/0148582 A1 | 6/2009 | Leibovich et al. | |
| 2011/0300264 A1* | 12/2011 | Neta ....................... | A23L 2/385 |
| | | | 426/442 |
| 2012/0276270 A1* | 11/2012 | Bisson ..................... | A23L 2/38 |
| | | | 426/575 |
| 2014/0314722 A1* | 10/2014 | Shastri ................ | C08B 37/0042 |
| | | | 536/123 |
| 2015/0118365 A1 | 4/2015 | Hollenkamp | |
| 2018/0110237 A1 | 4/2018 | Isaacs et al. | |

FOREIGN PATENT DOCUMENTS

WO        WO 98/04158 A1        2/1998

OTHER PUBLICATIONS

Chets's Anytime, "Bloody Mary Seasoning Mix". Available online as of Aug. 25, 2018, from www.chetsbloodymary.com. pp. 1-6. (Year: 2018).*
International Search Report and Written Opinion for Application No. PCT/US2021/039476, mailed Oct. 19, 2021.
International Preliminary Report on Patentability for Application No. PCT/US2021/039476, mailed Jan. 12, 2023.

* cited by examiner

*Primary Examiner* — Jenna A Watts
(74) *Attorney, Agent, or Firm* — Wolf, Greenfield & Sacks, P.C.

(57) ABSTRACT

The present disclosure generally relates to beverages, and to systems and methods for creating beverages. In certain aspects, a beverage precursor can be contained within a gel, such as a carboxylate agarose gel or other gel suitable for human consumption. The precursor can be mixed with water to form a beverage. In some cases, a composition comprising the beverage precursor may also contain ice, e.g., a gel may be frozen or embedded in the ice. The ice may be heated or mixed with water (or otherwise physically disrupted) to release the precursor, which mixes with the water to form the beverage. A variety of beverage precursors are possible, including alcoholic beverages (e.g., beer, wine, rum, cognac, cocktails, etc.), juices, etc. In addition, in certain embodiments, the precursors may also include gas-forming agents, and/or other ingredients suitable for drinks, such as sugar, artificial sweetener, food coloring, flavoring, etc. Other aspects include methods for making or using such compositions, kits including such compositions, or the like.

18 Claims, 4 Drawing Sheets

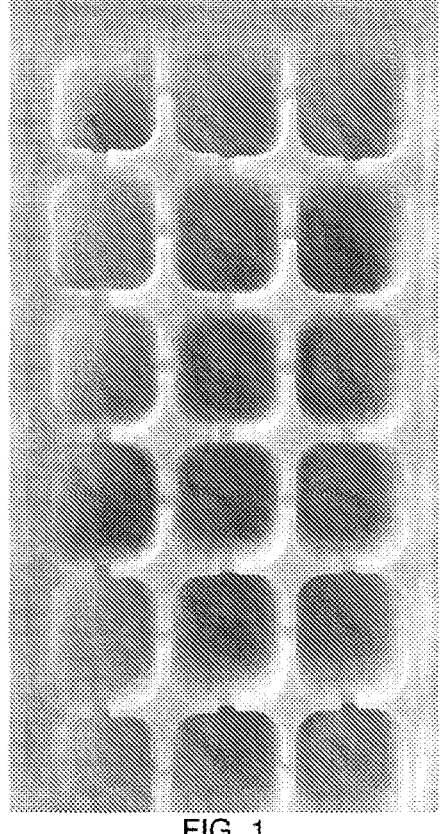
FIG. 1
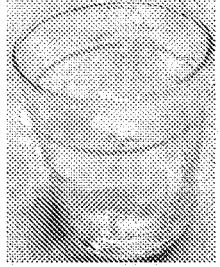 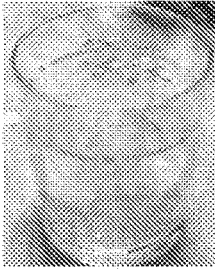 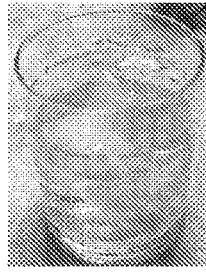 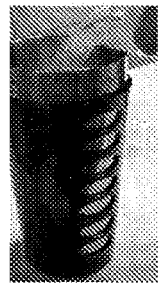 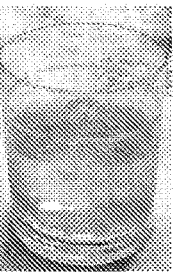
FIG. 2A        FIG. 2B        FIG. 2C        FIG. 2D        FIG. 2E

| Gel Designation | Formulation |
|---|---|
| Column1-Row3 | 3 ml formulation #1 + blue food coloring |
| Column1-Row2 | 3 ml formulation #1 + layer of Sodium bicarbonate $(NaHCO_3)$ $1/8^{th}$ teaspoon + layer of formulation #3 (SANDWICH configuration) |
| Column2-Row3 | 3 ml Formulation #2 + blue food coloring |
| Column2-Row2 | 3 ml Formulation #2 + layer of Sodium bicarbonate $(NaHCO_3)$ ) $1/8^{th}$ teaspoon |
| Column2-Row1 | 2 ml of Formulation #2 + teaspoon of apple vinegar |
| Column3-Row3 | 3 ml Formulation #3 + blue food coloring |
| Column3-Row2 | 3 ml formulation #3 + layer of Sodium bicarbonate $(NaHCO_3)$ ) $1/8^{th}$ teaspoon + layer of formulation #1 (SANDWICH configuration) |
| Column3-Row1 | 2 ml of Formulation #3 + teaspoon of apple vinegar |

FIG. 3B

SYSTEMS AND METHODS FOR CREATING BEVERAGES

RELATED APPLICATIONS

This application is a national stage filing under 35 U.S.C. § 371 of International Patent Application Serial No. PCT/US2021/039476, filed Jun. 29, 2021, entitled "Systems and Methods for Creating Beverages," which claims the benefit of U.S. Provisional Patent Application Ser. No. 63/046,339, filed Jun. 30, 2020, entitled "Systems and Methods for Creating Beverages," each of which is incorporated herein by reference in its entirety.

FIELD

The present disclosure generally relates to beverages, and to systems and methods for creating beverages.

BACKGROUND

A beverage is a liquid (or a near-liquid) intended for human consumption by drinking. In addition to their basic function of satisfying thirst, beverages play important roles in human culture. A variety of beverages are well-known and are widely consumed. Common types of beverages include plain drinking water, milk, coffee, tea, hot chocolate, juice, or soft drinks. In addition, alcoholic beverages such as wine, beer, and liquor, which contain alcohol (ethyl alcohol), have been part of human culture for more than 8,000 years.

SUMMARY

The present disclosure generally relates to beverages, and to systems and methods for creating beverages. The subject matter of the present disclosure involves, in some cases, interrelated products, alternative solutions to a particular problem, and/or a plurality of different uses of one or more systems and/or articles.

Some aspects are generally directed to compositions. In one set of embodiments, the composition comprises ice comprising an edible gel and a beverage precursor. In another set of embodiments, the composition comprises a carboxylate agarose gel comprising at least 10 vol % ethyl alcohol. The composition, in yet another set of embodiments, comprises an edible gel comprising a beverage precursor. In still another set of embodiments, the composition comprises a beverage comprising carboxylate agarose. The composition comprises a kosher beverage comprising ethyl alcohol and carboxylate agarose, in another set of embodiments. According to still another set of embodiments, the composition comprises a halal beverage comprising ethyl alcohol and carboxylate agarose. The composition, in yet another set of embodiments, comprises a parve beverage comprising ethyl alcohol and carboxylate agarose.

According to another set of embodiments, the composition comprises a first region, and a second region in contact with the first region, the second region being compositionally distinguishable from the first region. In some cases, at least one of the first region and the second region comprises an edible gel. In certain instances, at least one of the first region and the second region comprises a beverage precursor.

In addition, certain aspects are generally directed to methods. The method, in accordance with one set of embodiments, comprises adding water to a composition comprising ice comprising an edible gel and a beverage precursor. In another set of embodiments, the method comprises providing a composition comprising ice comprising an edible gel and a beverage precursor, and releasing the beverage precursor from the ice. The method, in yet another set of embodiments, comprises providing a composition comprising ice comprising an edible gel and a beverage precursor, and melting the ice. According to still another set of embodiments, the method comprises providing a container comprising water and a plurality of edible gel particles having an average diameter of at least 1 cm, and stirring the water in the container until the edible gel particles have an average diameter of less than a 1 mm.

In another set of embodiments, the method comprises sealing a composition comprising an edible gel, a beverage precursor, and a gas-forming agent in a container, and causing the gas-forming agent to form a gas within the sealed container to pressurize the container.

Still another set of embodiments is generally directed to a method comprising adding water to a gel comprising a beverage precursor. Another set of embodiments is directed to a method of providing a gel comprising a beverage precursor, and releasing the beverage precursor from the gel. Still another set of embodiments is generally directed to providing a gel comprising a beverage precursor at a temperature of less than 0° C., and heating the gel to a temperature of greater than 0° C.

Yet another set of embodiments is generally directed to a method of adding water to a carboxylate agarose gel comprising at least 10 vol % ethyl alcohol. Still another set of embodiments is generally directed to a method comprising providing a carboxylate agarose gel comprising at least 10 vol % ethyl alcohol, and releasing the ethyl alcohol from the gel. Yet another set of embodiments is generally directed to a method comprising providing a carboxylate agarose gel comprising at least 10 vol % ethyl alcohol at a temperature of less than 0° C., and heating the gel to a temperature of greater than 0° C.

Various devices are contemplated in yet another aspects. For example, in one embodiment, the device comprises a compartment containing a composition comprising an edible gel and a beverage precursor, a source of water for mixing with the composition, an a dispenser to dispense the composition and water from the source of water.

Still another aspect is generally drawn towards a sealed container, containing an edible gel comprising a beverage precursor and a gas-forming agent therein.

In another aspect, the present disclosure encompasses methods of making one or more of the embodiments described herein, for example, a composition for creating beverages such as is described herein. In still another aspect, the present disclosure encompasses methods of using one or more of the embodiments described herein, for example, a composition for creating beverages such as is described herein.

Other advantages and novel features of the present disclosure will become apparent from the following detailed description of various non-limiting embodiments when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 1 illustrates ice comprising gel and beverage precursors (which may include ethyl alcohol), in various embodiments;

FIG. 2A-2E illustrates a beverage formed in accordance with another embodiment;

FIGS. 3A-3B illustrate the formation of various gels, including gels comprising food coloring, sodium bicarbonate, vinegar, etc., in accordance with certain embodiments.

DETAILED DESCRIPTION

Figure 3A:
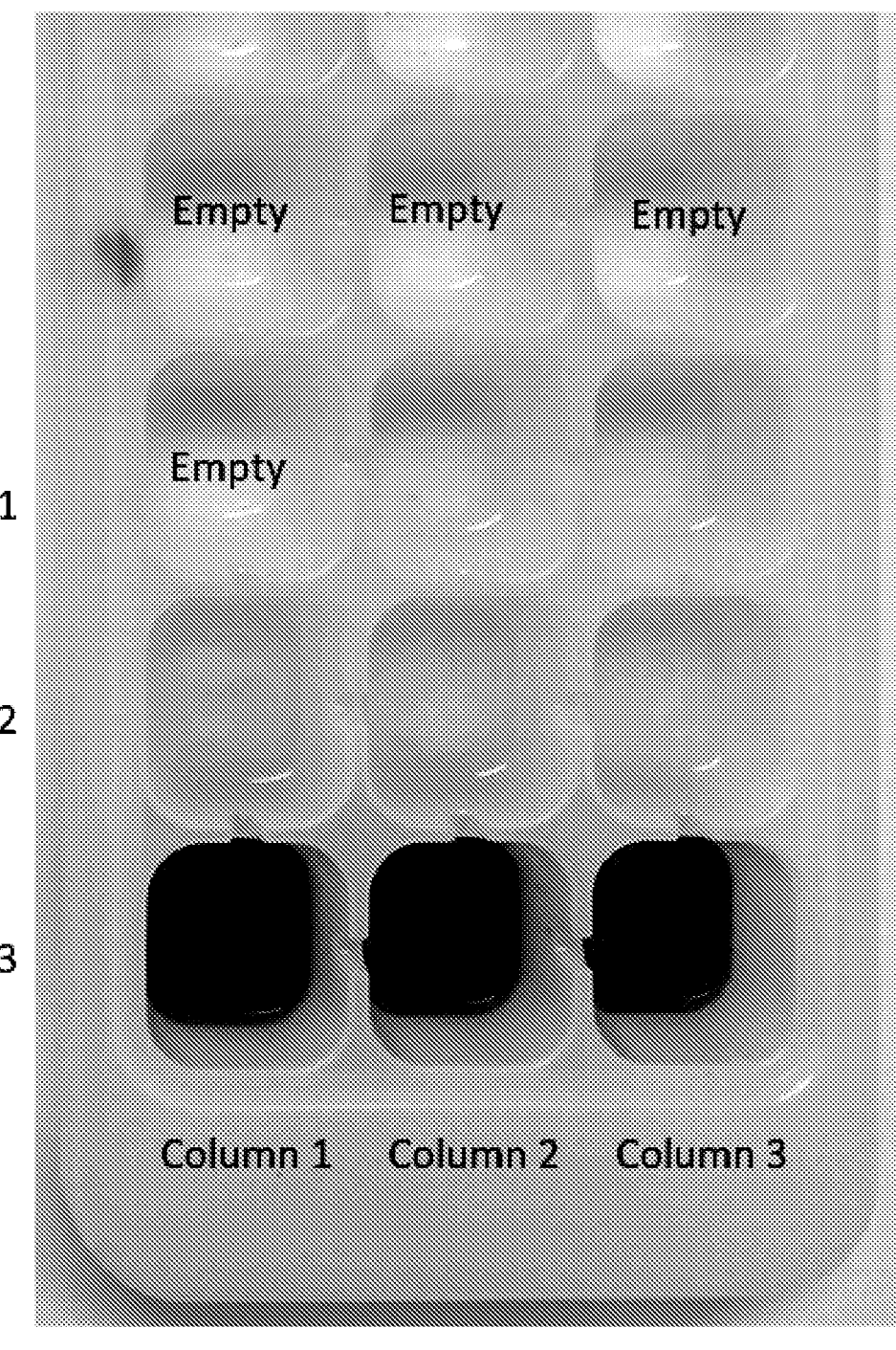

The present disclosure generally relates to beverages, and to systems and methods for creating beverages. In certain aspects, a beverage precursor can be contained within a gel, such as a carboxylate agarose gel or other gel suitable for human consumption. The precursor can be mixed with water to form a beverage. In some cases, a composition comprising the beverage precursor may also contain ice, e.g., a gel may be frozen or embedded in the ice. The ice may be heated or mixed with water (or otherwise physically disrupted) to release the precursor, which mixes with the water to form the beverage. A variety of beverage precursors are possible, including alcoholic beverages (e.g., beer, wine, rum, cognac, cocktails, etc.), juices, etc. In addition, in certain embodiments, the precursors may also include gas-forming agents, and/or other ingredients suitable for drinks, such as sugar, artificial sweetener, food coloring, flavoring, etc. Other aspects include methods for making or using such compositions, kits including such compositions, or the like.

One aspect of the present disclosure is generally directed to systems and methods for creating beverages using gel compositions such as those described herein. Examples of gels include carboxylate agarose or others discussed herein. The compositions may include a beverage precursor that can be mixed with water to form the final beverage. A variety of beverages suitable for human consumption may be produced, including alcoholic beverages, cocktails or mocktails, juices, soda pop, mixed drinks, smoothies, or others such as those discussed herein. In some cases, the gels may be frozen, e.g., with ice, although in other cases, the gels may not necessarily be frozen, and could instead be stored at ambient or other temperatures.

One set of embodiments is generally directed to systems and methods for creating beverages by mixing a composition, such as described herein, with water or another liquid. The composition may dissolve therein to produce a beverage, e.g., which can be immediately drunk, mixed with other components, stored for later use, etc., as with other types of beverages. The water may be, for example, tap water, distilled water, mineral water, spring water, etc. In addition, in certain cases, the composition may be mixed with other liquids, e.g., instead of or in addition to water. For example, in some embodiments, a composition such as described herein may be mixed with milk, orange juice, apple juice, or the like to produce a suitable beverage.

The mixing may be done manually (e.g., using a stir stick, swizzle stick, spoon, knife, straw, spatula, or other utensil, or just by swirling the container), or in some cases, the mixing may be performed using a blender, mixer, or the like. The mixing may be performed using a shaker or shaker flask, or within the container used to serve the beverage (e.g., a pitcher, a cup, mug, tumbler, or other drinkware, glassware, stemware, beverageware, plasticware, etc.). The mixing may be performed in a container that is sealed, or one that is open to the atmosphere, etc.

In some embodiments, a sealed container may be useful, for example, if the composition includes gas-forming agents or effervescent agents, e.g., to produce an effervescent beverage or a "fizzy" drink. For instance, a composition such as is described herein may be placed into a container and the container may be sealed, and $CO_2$ and/or other gases produced using gas-forming agents or effervescent agents may remain in the container and thereby increase the pressure within the container and/or become dissolved in solution within the container. Examples of such agents are described in detail herein. After a suitable period of time, sufficient gas may be produced in certain embodiments, for example, to form an effervescent beverage within the container. For instance, the period of time may be at least 5 minutes, at least 10 minutes, at least 20 minutes, at least 30 minutes, at least 45 minutes, at least 60 minutes, at least 90 minutes, at least 120 minutes, etc.

In some cases, gel present within the composition may be broken down into smaller pieces. The gel may be allowed to remain within the beverage, and/or the pieces of gel may be filtered from the beverage, e.g., depending on the embodiment. In addition, in certain embodiments, the gel may partially or completely dissolve, e.g., such that there are no pieces of gel in the final beverage. For example, the gel may be one that is soluble in the beverage at room temperature, or temperatures below room temperature (about 25° C.). For instance, the gel may be soluble at temperatures at which the beverage is served; as a non-limiting example, if the beverage is one that is typically served with ice, then the beverage may be at a temperature of between 0° C. and 25° C., and the gel may be a gel that is soluble within the beverage at those temperatures.

The volume of water or other liquid mixed with the composition can vary, and may not be uniform or exact in some embodiments. In certain cases, the volume may be the volume of a suitable container (e.g., a pitcher, cup, mug, tumbler, etc. such as those described herein) that the beverage is intended to be served in. The container may, in certain instances, be one that can be sealed. This may be useful, for example, in embodiments where an effervescent beverage is to be produced, e.g., as is described herein.

In some embodiments, the volume may be 20 ml or more, 25 ml or more, 40 ml or more, 50 ml or more, 70 ml or more, 100 ml or more, 125 ml or more, 150 ml or more, at least 200 ml or more, at least 222 ml or more, at least 237 ml or more, at least 250 ml or more, at least 330 ml or more, at least 341 ml or more, at least 350 ml or more, at least 355 ml or more, at least 375 ml or more, at least 440 ml or more, at least 473 ml or more, at least 500 ml or more, at least 568 ml or more, at least 1000 ml or more, at least, etc. In addition, in certain embodiments, the volume may be less than the volumes provided here. For example, the volume may be 1000 ml or less, 568 ml or less, 500 ml or less, 473 ml or less, 440 ml or less, 375 ml or less, 355 ml or less, 350 ml or less, 341 ml or less, 330 ml or less, 250 ml or less, 237 ml or less, 222 ml or less, 200 ml or less, 150 ml or less, 125 ml or less, 100 ml or less, 70 ml or less, 50 ml or less, 40 ml or less, 25 ml or less, or 20 ml or less. Combinations of any of these volumes are also possible in certain cases, e.g., the volume of water or other liquid may be between 150 ml and 222 ml, between 350 ml and 375 ml, etc.

In addition, in some embodiments, the composition is kosher, parve, halal, and/or vegan, or the beverage produced with the composition is kosher, parve, halal, and/or vegan. For instance, the composition and/or the beverage may be free of free of components derived from mammals, birds, and fish; free of foods such as fish, eggs, grains, fruit and produce; free of pork or blood; or free of any animal products. For example, in some cases, the composition does not contain gelatin, or other animal products.

In some cases, more than one such composition may be used together, for example, to create a mixed drink. As an example, in one embodiment, a beverage may be formed from a first composition and a second composition different from the first composition. The compositions may be, e.g., any of those discussed herein. In such a way, a variety of different mixed drinks or blends may be formed. As a non-limiting example, a first composition may produce tequila when mixed with water and a second composition may produce orange juice and grenadine syrup when mixed with water, such that by mixing pieces of the first composition and pieces of the second composition, a tequila sunrise may be formed. The second composition may also include other juices, such as pineapple juice, apple juice, lemon juice, lime juice, etc., and/or other flavors such as any of those discussed herein. As another non-limiting example, a screwdriver can be made using a first composition that may produce orange juice and a second composition that may produce vodka. As yet another non-limiting example, a pina colada can be formed using a first composition that may produce pineapple juice, a second composition that may produce coconut milk, and a third composition that may produce rum. Still other examples include daiquiris, martinis, margaritas, manhattans, or the like.

The composition, in one set of embodiments, comprises a gel. The gel may be used to contain a beverage precursor. The gel accordingly may be edible. In some cases, the gel is non-toxic, or generally safe to eat or drink. For example, the gel may be one that is "Generally Recognized as Safe" (GRAS) by the US Food and Drug Administration. In some cases, the gel may be one which has been commonly recognized or is in widespread use in foods or beverages at significant or recognizable quantities (i.e., as opposed to trace or contaminant amounts), e.g., as being suitable for human consumption. In some cases, the gel may be one that has no significant recognized deleterious effects when consumed by humans in reasonable or typical amounts. In certain embodiments, the edible gel is of food-grade purity. In addition, in one set of embodiments, the gel is free of any animal products. The gel may also be kosher, parve, halal, and/or vegan.

In addition, in certain embodiments, the gel may be one that is transparent, or becomes at least partially transparent within water. For instance, when the composition is used to form a beverage, e.g., by mixing with water, the gel may become difficult to observe, such that it is difficult or impossible to determine that the gel is present within the beverage. In some cases, the gel may be allowed to settle to the bottom of the beverage, and/or filtered out before consumption of the beverage. In other cases, however, the gel may be consumed with the beverage, e.g., if the gel is an edible gel. As a non-limiting example, the drink may be a bubble tea, a grass jelly drink, or other drink containing gels or other materials.

Furthermore, in some embodiments, the gel may partially or completely dissolve within the beverage, such that there are no solid or semisolid pieces of gel present within the final beverage. In one set of embodiments, after the gel is used to form a beverage, e.g., by mixing with water, relatively small pieces of gel may be present within the final beverage, e.g., where the particles have an average diameter of less than 1 cm, less than 1 mm, less than 0.9 mm, less than 0.8 mm, less than 0.7 mm, less than 0.6 mm, less than 0.5 mm, less than 0.4 mm, less than 0.3 mm, less than 0.2 mm, less than about 0.1 mm, less than about 0.09 mm, less than about 0.08 mm, less than about 0.07 mm, less than about 0.06 mm, less than about 0.05 mm, etc. The diameter of a nonspherical particle, such as pieces of gel, may be taken as the diameter of a perfect sphere having the same volume as the nonspherical particle.

In one embodiment, the gel is an agar gel, e.g., produced from red algae or red seaweed. In some cases, the gel comprises agarose and/or agaropectin. In some cases, the gel may be modified in some way. As a non-limiting example, the agarose may be at least partially carboxylated (e.g., the primary alcohol of the D-galactose may be reacted with a carboxylic acid). Thus, for example, the gel may include carboxylate agarose. In some cases, carboxylate agarose may dissolve in water, e.g., at temperatures of around room temperature (about 25° C.), or less. Other examples include, but are not limited to, sulfonated agarose, sulfated agarose, phosphorylated agarose, halogenated agarose (e.g., chlorinated agarose, brominated agarose, etc.), phosphate agarose, etc.

Other examples of gels include, but are not limited to, alginic acid, sodium alginate, potassium alginate, ammonium alginate, calcium alginate, brown algae extract, carrageenan, kappa-carrageenan, carboxylated kappa-carrageenan, locust bean gum, pectin, gelatin (including gelatin A, gelatin B, etc.), tapioca, collagen, polyethylene glycol, or the like. In addition, in some instances, a combination of more than one of these and/or other gels may be used. For example, the gel may include a mixture of carboxylated agarose with gelatin, carboxylated agarose with alginate, carboxylated agarose with carrageenan, alginate and carrageenan, or the like.

If the gel is carboxylate agarose, the gel may have any degree or percentage of carboxylation. For instance, the agarose may exhibit at least 5%, at least 7%, at least 10%, at least 12%, at least 15%, at least 18%, at least 20%, at least 22%, at least 25%, at least 28%, at least 30%, at least 32%, at least 35%, at least 38%, at least 40%, at least 42%, at least 45%, at least 48%, at least 50%, at least 52%, at least 55%, at least 58%, at least 60%, at least 62%, at least 65%, at least 68%, at least 70%, at least 72%, at least 75%, at least 78%, at least 80%, at least 82%, at least 85%, at least 88%, at least 90%, at least 92%, at least 95%, etc. carboxylation. In some cases, the agarose may exhibit no more than 98%, no more than 95%, no more than 93% no more than 90% no more than 88% no more than 85% no more than 82% no more than 80% no more than 78% no more than 75% no more than 72% no more than 70% no more than 68% no more than 65% no more than 62% no more than 60% no more than 58% no more than 55% no more than 52% no more than 50% no more than 48% no more than 45% no more than 42% no more than 40% no more than 38% no more than 35% no more than 32% no more than 30% no more than 28% no more than 25% no more than 22% no more than 20% no more than 18% no more than 15% no more than 12% no more than 10% no more than 8% no more than 5%, etc. carboxylation. Combinations of any of these are also possible, e.g., the agarose may exhibit between 28% and 93%, between 30% and 50%, between 70% and 78%, etc. carboxylation.

The gel may form any suitable percentage of the composition. For example, the gel may form at least 0.01 wt %, at least 0.05 wt %, at least 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1 wt %, at least 2 wt %, at least 3 wt %, at least 4 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, etc. of the composition. The gel may also form no more than 95 wt %, no more than 90 wt %, no more than 85 wt %, no more than 80 wt %, no more than 75 wt %, no more than 70 wt %, no more than 65 wt %, no more than 60 wt %, no more than 55 wt %, no more than 50 wt %, no more than 45 wt %, no more than 40 wt %, no more than 35 wt %, no more than 30 wt %, no more than 25 wt %, no more than 20 wt %, no more than 15 wt %, no more than 10 wt %, no more than 5 wt %, no more than 4 wt %, no more than 3 wt %, no more than 2 wt %, no more than 1 wt %, no more than 0.9 wt %, no more than 0.8 wt %, no more than 0.7 wt %, no more than 0.6 wt %, no more than 0.5 wt %, no more than 0.4 wt %, no more than 0.3 wt %, no more than 0.2 wt %, no more than 0.1 wt %, no more than 0.05 wt %, or no more than 0.01 wt %, etc. of the composition. In addition, in some embodiments, combinations of this ranges are also possible. As non-limiting examples, the gel may form between 30 wt % and 40 wt %, between 40 wt % and 45 wt %, between 50 wt % and 60 wt %, etc. of the composition.

It should be understood that the gel itself may include water, i.e., as part of the physical structure of the gel. For example, the gel may be formed from water, and a polymer or other gel-forming material. The dry weight of the gel-forming material within the gel may be, for instance, no more than 10 wt %, no more than 9 wt %, no more than 8 wt %, no more than 7 wt %, no more than 6 wt %, no more than 5 wt %, no more than 4.5 wt %, no more than 4 wt %, no more than 3.5 wt %, no more than 3 wt %, no more than 2.5 wt %, no more than 2 wt %, no more than 1.5 wt %, no more than 1 wt %, no more than 0.9 wt %, no more than 0.8 wt %, no more than 0.7 wt %, no more than 0.6 wt %, no more than 0.5 wt %, no more than 0.4 wt %, no more than 0.3 wt %, no more than 0.2 wt %, no more than 0.1 wt %, etc. In addition, in some embodiments, the dry weight of the gel-forming material within the gel may be at least 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1 wt %, at least 1.5 wt %, at least 2 wt %, at least 2.5 wt %, at least 3 wt %, at least 3.5 wt %, at least 4 wt %, at least 4.5 wt %, at least 5 wt %, at least 6 wt %, at least 7 wt %, at least 8 wt %, at least 9 wt %, at least 10 wt %, etc. Combinations of any of these percentages are also possible. For instance, in various embodiments, the dry weight of the gel-forming material within the gel may be between 0.1 wt % and 2 wt %, between 1 wt % and 5 wt %, between 0.1 wt % and 0.3 wt %, between 0.9 wt % and 1.5 wt %, or the like.

The composition, in one set of embodiments, also includes a beverage precursor. The beverage precursor may, in certain cases, be formed as part of the gel, although in other cases, the beverage precursor may be physically contained within the gel, separate from the gel, etc. The beverage precursor may, when mixed with water or another liquid, including those discussed herein, results in a suitable beverage, e.g., for human consumption. Most common types of beverages suitable for human consumption are widely recognized and need no explanation; non-limiting examples of some of the more common types of beverages are described below. In addition, it should be understood that for many common types of beverages, the precise composition of ingredients has not been clearly identified, yet those beverages will be widely recognized. For example, the composition of beverages such as orange juice, coffee, etc. may change from batch to batch or brand to brand, but the composition will nonetheless be recognized by almost everyone as orange juice, coffee, etc.

The beverage precursor may be mixed with various volumes of water or other liquids such as those described herein to from the beverage. In addition, in some cases, more than one beverage precursor may be used, e.g., to form a cocktail or a mixture of two or more beverages. Accordingly, in some embodiments, a beverage precursor may be formed by partially or completely dehydrating or concentrating a beverage, e.g., a beverage concentrate. When the beverage precursor is mixed with water, thereby rehydrating it, the original beverage may be substantially restored.

The beverage precursor may form any suitable percentage of the composition. For example, the beverage precursor may form at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, etc. of the composition. The gel may also form no more than 95 wt %, no more than 90 wt %, no more than 85 wt %, no more than 80 wt %, no more than 75 wt %, no more than 70 wt %, no more than 65 wt %, no more than 60 wt %, no more than 55 wt %, no more than 50 wt %, no more than 45 wt %, no more than 40 wt %, no more than 35 wt %, no more than 30 wt %, no more than 25 wt %, no more than 20 wt %, no more than 15 wt %, no more than 10 wt %, or no more than 5 wt %, of the composition. In addition, in some embodiments, combinations of this ranges are also possible. As non-limiting examples, the beverage precursor may form between 30 wt % and 40 wt %, between 40 wt % and 45 wt %, between 50 wt % and 60 wt %, etc. of the composition.

As mentioned, the beverage precursor may form a suitable beverage when mixed with water or another liquid. For instance, the beverage precursor may, when mixed with water, form an alcoholic beverage. Non-limiting examples of alcoholic beverages include beer, wine, rum, cognac, mead, sake, huangjiu, cider, vodka, baijiu, shochu, soju, gin, rum, tequila, mezcal, whisky, or mixtures of these and/or other alcoholic beverages, for example, cocktails. Thus, in some cases, the beverage precursor comprises ethyl alcohol to produce the alcoholic beverage. In some cases, the beverage precursor may contain at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, etc. ethyl alcohol. In addition, it will be understood that, since the beverage precursor may comprise a dehydrated extract that is to be mixed with water or another liquid to form the alcoholic beverage, the percentage of alcohol within the composition may be substantially higher than that ordinarily expected for the final alcoholic beverage.

In addition, beverages other than alcoholic beverages are also contemplated in other embodiments. For example, in one set of embodiments, the beverage precursor may form beverages such as milk, coffee, tea, hot chocolate, juices, or soft drinks. Non-limiting examples of juices, such as fruit juices, include apple, beet, blackberry, cantaloupe, carrot, celery, cherry, cranberry, coconut, cucumber, grape, grapefruit, guava, honeydew, kiwi fruit, lemon, lime, mango, orange, papaya, passionfruit, parsley, pineapple, pomegranate, prune, raspberry, strawberry, sugarcane, tomato, turnip, watercress, watermelon, winter melon, or the like. In some cases, the beverage precursor may form a juice blend, such as POG (passionfruit-orange-guava), carrot-orange, pineapple-mango, orange-strawberry, or the like. In some cases, the beverage precursor may be present in the form of a dry powder, a concentrate (e.g., present as a liquid, a semi-solid, a slush, a solid, etc.), shavings, pulp, or the like. Non-limiting examples of powdered fruit juices include those described in U.S. Pat. No. 2,816,039

In some cases, a beverage extract may be used as a beverage precursor. For instance, a beverage may be pressed, ground, heated, roasted, distilled, exposed to an extracting liquid, etc., to form a suitable beverage extract. Non-limiting examples of extracts include extracts of tea, coffee, or certain alcoholic beverages, as well as other beverages such as those described herein.

In certain embodiments, the beverage precursor may comprise a partially or completely dehydrated extract of a drink, such as an alcoholic beverage. For example, a beverage, including any of those described herein, may be dehydrated to produce an extract, which may be used as a beverage precursor in compositions such as those described herein. In some embodiments, the beverage precursor includes a concentrate, such as a juice concentrate, e.g., formed by formed by removing water from the beverage. When the beverage precursor of the composition is mixed with water, the beverage may be reformed. Thus, in some cases, any of a wide variety of beverages may be dehydrated to form a beverage precursor for various compositions such as described herein. Non-limiting examples of such beverage precursors include dehydrated extracts of beer, wine, juice, or any other beverages such as those described herein.

In addition, in some cases, other ingredients may be present within the beverage precursor. One or more than one additional ingredients may be present. For example, the beverage precursor may comprise sugars and/or artificial sweeteners, flavorings, fragrance, aromas, food coloring, alcohol (ethyl alcohol), or the like. Non-limiting examples of sugars include, but are not limited to, sucrose, lactose, maltose, glucose, galactose, fructose, dextrose, etc. Non-limiting examples of artificial sweeteners include, but are not limited to, acesulfame potassium, aspartame, saccharin, sucralose, cyclamate, monk fruit extract, mogroside, stevia, sorbitol, xylitol, mannitol, erythritol, lactitol, etc.

Non-limiting examples of food colorings include, but are not limited to, FD&C Blue No. 1, FD&C Blue No. 2 FD&C Green No. 3, FD&C Red No. 3, FD&C Red No. 40, FD&C Yellow No. 5, FD&C Yellow No. 6, annatto, caramel, carmine, elderberry juice, lycopene, paprika, turmeric, etc. In some cases, the food colorings may be selected to give the composition and/or the beverage a particular color, e.g., red, yellow, etc. In addition, in certain cases, more than one type of food coloring may be present, e.g., such that they can be combined to produce a beverage having a certain color. Thus, as a non-limiting example, a composition may have a first layer or region comprising a first food coloring (e.g., red) and a second layer or region comprising a second food coloring (e.g., blue), such that the final beverage is a mixture of these colors (e.g., purple).

Non-limiting examples of flavoring agents, fragrances, or aromas include manzanate, diacetyl, acetylpropionyl, acetoin, isoamyl acetate, benzaldehyde, cinnamaldehyde, ethyl propionate, methyl anthranilate, limonene, ethyl decadienoate, allyl hexanoate, ethyl maltol, 2,4-dithiapentane, ethylvanillin, methyl salicylate, glutamic acid, a glycine salt, a guanylic acid salt, an inosinic acid salt, 5'-ribonucleotide salts, acetic acid, ascorbic acid, citric acid, fumaric acid, lactic acid, malic acid, phosphoric acid, tartaric acid, gluconic acid, etc. Oher examples of flavoring agents, fragrances, or aromas include extracts of rose, jasmine, mint, vanilla, grass, coffee, bacon, coconut, orange, seawater, cinnamon, lavender, hyacinth, primrose, plumeria, ylang-ylang, eucalyptus, lily of the valley, freesia, viburnum, tuberose, osmanthus, lilac, brugmansia, daphne, champaca, lily, honeysuckle, gardenia, wisteria, frangipani, chocolate, or the like.

Ingredients such as any of the ones described herein may be present as any suitable percentage of the beverage precursor. For example, ingredients including any one or more of these may be present within the beverage precursor at percentages of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, etc.

In one set of embodiments, the composition may include one or more gas-forming agents or effervescent agents. For example, the composition may contain an agent that reacts with water to produce a gas, and/or the composition may contain two or more agents that react with each other to produce a gas. Thus, the composition, in certain cases, can be used to form an effervescent beverage or a "fizzy" drink. For example, in one embodiment, the gas may be carbon dioxide, e.g., to create soda pop, champagne, or other gas-containing or effervescent beverages. As a specific non-limiting example, the composition may contain a carbonate, such as baking soda (sodium bicarbonate, $NaHCO_3$), $NaCO_3$, $CaCO_3$, magnesium carbonate, magnesium bicarbonate, etc., and an acid, such as acetic acid, citric acid, tartaric acid (or cream of tartar), gluconic acid, apple cider, lactic acid, glycolic acid, propionic acid, butyric acid, adipic acid, stearic acid, sebacic acid, malic acid, fumaric acid, sodium citrate, potassium citrate, etc., that can react together to produce $CO_2$. As a specific non-limiting example, the sodium bicarbonate may be incorporated as a layer on top of gel or as a layer sandwiched between two gel compositions. In addition, in certain embodiments, some types of citrus fruits, such as lemons, oranges, or limes, contain relatively large amounts of citric acid; for example, juices, extracts, or the like may be used in certain embodiments. A variety of organic acids and/or mineral acids, etc. can be used in certain cases. These may be present in any suitable form within the composition, e.g., as a powder, in solution, etc. For example, in one embodiment, carbon dioxide may be introduced under high pressure into a gel composition.

Such compositions can include, in some embodiments for example, starches such as starch wafers containing one or more carbonates and/or acids, such as those described herein. These can be, e.g., laced or cast with carbonates and/or an acids. Additional non-limiting examples of starches include, but are not limited to, HAMULSION® Stabiliser Systems, FRIMULSION® Stabiliser Systems, MULTIVANTAGE® Syrup, MIRA-SPERSE® Starch, MIRA-GEL® Starch, MIRA-CAP® Starch, TENDERFIL® Starch, DRESS'N® Starch, MIRA-CLEER® Starch, ESTABGEM® Stabiliser Systems, TECGEM® Stabiliser Systems, STA-MIST™ Starch, etc. As another example, the composition may contain compositions that form other gases, such as hydrogen. A non-limiting example of such a beverage, producing using lime juice and sodium bicarbonate, is shown in FIG. 3.

In one set of embodiments, the composition also includes ice or another frozen liquid. For example, the frozen liquid in some cases may be a frozen beverage precursor, such as those described herein. In some embodiments, the ice or other frozen liquid may be useful, for example, in cooling the beverage that is produced using the composition, and/or to control the final concentration of the beverage precursor, etc. However, it should also be understood that the ice or other frozen liquid is optional and not necessarily required in all embodiments.

The ice or other frozen liquid, if present, may form any suitable percentage of the composition. For example, the ice or other frozen liquid may form at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, etc. of the composition. The gel may also form no more than 95 wt %, no more than 90 wt %, no more than 85 wt %, no more than 80 wt %, no more than 75 wt %, no more than 70 wt %, no more than 65 wt %, no more than 60 wt %, no more than 55 wt %, no more than 50 wt %, no more than 45 wt %, no more than 40 wt %, no more than 35 wt %, no more than 30 wt %, no more than 25 wt %, no more than 20 wt %, no more than 15 wt %, no more than 10 wt %, or no more than 5 wt %, of the composition. In addition, in some embodiments, combinations of this ranges are also possible. As non-limiting examples, the ice or other frozen liquid may form between 30 wt % and 40 wt %, between 40 wt % and 45 wt %, between 50 wt % and 60 wt %, etc. of the composition.

In some embodiments, the ice or other frozen liquid may partially or completely embed the gel and/or the beverage precursor. For instance, the gel and/or the beverage precursor may be embedded completely within ice, e.g., to prevent the gel and/or the beverage precursor from exiting the composition, e.g., before being added to water or another liquid. If the gel and the beverage precursor, they may be frozen within the ice or other frozen liquid in any suitable configuration. For example, the gel and the beverage precursor may be frozen together in the same region, or in different regions, within the ice or other frozen liquid.

As another example, the composition may be formed as a plurality of layers or regions, e.g., of ice and/or gel and/or beverage precursor. For instance, there may be a first layer or region comprising ice, a second layer or region comprising gel, and a third layer or region comprising a beverage precursor, or two or more of these may be combined, e.g., there may be a first layer or region comprising ice, and a second layer or region comprising gel and beverage precursor. As another example, a composition may have a first layer or region comprising gel and a second layer or region comprising a beverage precursor (e.g., the composition may be free of ice). In some cases, more than one layer or region of the same ingredient may be present, e.g., there may be two or more layers or regions of ice, two or more layers or regions of gel and/or beverage precursor, two or more layers or regions of sugars, artificial sweeteners, flavorings, fragrance, aromas, food coloring, etc. The gels, beverage precursors, or other ingredients etc. may each independently be the same or different in the different layers or regions.

In addition, according to one set of embodiments, the composition may have any suitable shape or size. For example, in some cases, the composition may be have a generally cubical (e.g., ice cubes) or generally spherical shape. Other shapes are also possible in other embodiments. For example, in some embodiments, piece of the composition may appear as various molded forms.

Similarly, the composition may have any suitable size. In some cases, for example, the composition may have a size suitable for being easily added to a container such as a pitcher, cup, mug, tumbler, or others including those described herein.

In some embodiments, one or more pieces of the composition may be present. For example, if multiple pieces are present, e.g., as in a kit, they may independently have the same or different concentrations, compositions, shapes, sizes, etc. In some cases, one or more than one piece may be separately packaged, e.g., to be applied to different uses (e.g., different beverages). For instance, in some cases, only one piece of the composition is necessary to be mixed with water or another liquid to form a beverage, although in other cases, 2, 3, 4, 5, 6, 7, 8, or more piece of the composition is necessary to be mixed with water or another liquid to form a beverage. The number of pieces may also be a function of the size of the beverage desired, e.g., more pieces would be used for a pitcher rather than a single cup.

The various pieces of the composition may have any of a variety of masses, depending on the embodiment. For example, the pieces may have an average mass of less than 1000 g, less than 500 g, less than 300 g, less than 200 g, less than 100 g, less than 50 g, less than 30 g, less than 20 g, less than 10 g, less than 5 g, etc. In some cases, the pieces may have an average mass of at least 5 g, at least 10 g, at least 20 g, at least 30 g, at least 50 g, at least 100 g, at least 200 g, at least 300 g, at least 500 g, at least 1000 g, etc. Combinations of any of these volumes are also possible in certain cases. For example, the pieces may have an average mass of between 30 g and 50 g, between 10 g and 20 g, between 100 g and 300 g, or the like.

In addition, the various pieces of the composition may have any of a variety of sizes. For example, the pieces may have an average maximum internal dimension of no more than 10 cm, no more than 9 cm, no more than 8 cm, no more than 7 cm, no more than 6 cm, no more than 5 cm, no more than 4 cm, no more than 3 cm, no more than 2 cm, no more than 1 cm, etc. In one set of embodiments, the pieces may have an average diameter of at least 0.5 mm, at least 0.7 mm, at least 1 mm, at least 1.1 mm, at least 1.2 mm, at least 1.3 mm, at least 1.5 mm, at least 2 mm, at least 3 mm, at least 4 mm, at least 5 mm, at least 1 cm, at least 1.5 cm, at least 2 cm, at least 3 cm, at least 4 cm, at least 5 cm, at least 6 cm, at least 7 cm, at least 8 cm, at least 9 cm, at least 10 cm, etc. Combinations of any of these are possible in some cases, e.g., the pieces may have an average diameter of between 1 cm and 5 cm, between 1 mm and 1 cm, between 3 cm and 9 cm, or the like.

In addition, in some embodiments, the composition may be stored at a temperature of less than 0° C. (e.g., in a freezer), e.g., if ice or another frozen liquid is present. For example, the temperature of the composition may be less than −2° C., less than −5° C., less than −10° C., less than −15° C., less than −20° C., less than −25° C., less than −30° C., less than −35° C., less than −40° C., etc. However, it should be understood that this is not a requirement, and in other cases, the composition need not be stored at a temperature of less than 0° C. For instance, the composition may be stored at about 4° C. (e.g., in a refrigerator), ambient temperature (about 25° C.), etc.

As mentioned, in some aspects, multiple pieces of the composition may be present together in a kit. A kit typically defines a package or an assembly including one or more of the compositions of the invention, and/or other compositions associated with the invention, for example, as previously described.

For instance, in one embodiment, a kit may comprise one or more pieces of the composition, which may be individually or collectively sealed. In some cases, the kit may form compartments containing the pieces. The compartments may be hermetically sealed in some cases, for example, to limit the evaporation of water and/or alcohol. For instance, the compartments may be sealed using aluminum, or a polymer, such as Mylar, polyethylene terephthalate, Elvax, ethylene vinyl acetate, etc.

In addition, in some cases, the pieces of the composition may be packaged in suitable containers within the kit. For instance, the pieces may be contained within preformed cartons, trays, blister packs, individually packed units, or the like. One or more than one piece may be present within a compartment of the kit. For instance, the pieces may be the same or different (e.g., for use in the formation of mixed drinks). In some cases, the pieces may be emptied or "popped out" of the kit, e.g., into water or another liquid to produce the beverage.

As another example, the composition may also be packaged as a gel or a semi-solid. For instance, in some cases, the gel may be contained within a tube. In some cases, the tube may be squeezed (e.g., by hand) to push out the composition. In certain embodiments, a tube-like device could contain a single gel formulation (which, in some embodiments, could be combined with other formulations to create the beverage), and/or have several perforatable or breachable compartments. In some cases, a compartment could be torn or breached, for example, through simple hand pressure, in a machine designed to prepare beverages, or the like, e.g., such as is described herein. In some embodiments, a compartment that, when squeezed, may be breached. Multiple compartments may, in certain instances, be torn or breached, sequentially or simultaneously, to produce a beverage, e.g., as discussed herein.

One set of embodiments is generally directed to kits that are sold without ice, but to which a user can add water which is frozen to produce ice. For instance, a composition comprising a gel and/or a beverage precursor, such as any of those described herein, may be obtained by a user, who then adds water and freezes the composition. For instance, the kit may be in the form of a tray or other container containing one or more compartments containing the composition (and which the compartments may independently have the same or different compositions). The user adds water to some or all of the compartments, then freezes the kit, e.g., in the freezer, to produce a composition comprising ice as well as the gel and/or beverage precursor. After freezing, the composition within the compartments can be removed as desired and used to produce a beverage.

In addition, in some cases, such compositions may be protected, prior to the addition of water. For instance, if the composition contains alcohol or other volatiles, then the compositions may be protected in some fashion to prevent such volatiles from evaporating, e.g., prior to the addition of water. As an example, in certain embodiments, the composition may be coated with starch or another coating that partially or fully seals in the volatiles. In some cases, the coating may be one that is soluble in water. Thus, upon addition of water, the volatiles may dissolve in the water, for example, during the formation of the beverage, or to produce ice compositions such as described above, which can then later be used to produce a beverage.

Furthermore, a kit may, in some cases, include instructions in any form that are provided in connection with the compositions of the invention in such a manner that the instructions would be recognized as being associated with the compositions described herein. For instance, the instructions may include instructions for the use, modification, mixing, diluting, preserving, administering, assembly, storage, packaging, and/or preparation of the compositions associated with the kit. In some cases, the instructions may also include instructions for the preparation and/or consumption of the compositions, for example, for a particular use. The instructions may be provided in any form recognizable as a suitable vehicle for containing such instructions, for example, written or published, verbal, audible (e.g., telephonic), digital, optical, visual (e.g., videotape, DVD, etc.) or electronic communications (including Internet or web-based communications), provided in any manner.

In some cases, the gel may be formed by mixing a gel-forming material with other ingredients such as those described herein, to form the gel. For example, the gel-forming material may be mixed with ingredients such as water, a beverage precursor, sugars and/or artificial sweeteners, flavorings, fragrance, aromas, food coloring, alcohol (ethyl alcohol), gas-forming agents, etc., such as any of those described herein. However, it should be understood that not all of these may be present; for example, they may be absent from the final beverage, or present but in a different layer or region of the composition, rather than with the gel.

The gel-forming material may then be caused to form a gel. For instance, in one set of embodiments, the mixture is heated to a suitable temperature (e.g., to a temperature of at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., etc. and/or no more than 100° C., no more than 95° C., no more than 90° C., no more than 85° C., no more than 80° C., no more than 75° C., no more than 70° C., no more than 65° C., no more than 60° C., no more than 55° C., no more than 50° C., no more than 45° C., no more than 40° C., no more than 35° C., no more than 30° C., etc.), then allowed to cool to form a gel. For instance, the gel may be heated by adding the gel to water, e.g., heated to temperatures such as these. As a non-limiting example, the water may be at a temperature of at least 80° C., at least 95° C., between 85° C. and 90° C., etc.

In addition, certain aspects of the present disclosure are directed to devices suitable for producing beverages such as those described herein. When a user activates the device (e.g., by pushing a button), the device may distribute a beverage, for example, into a cup or other suitable container used to serve the beverage. For instance, the container may be placed in or on the device by the user, or the device itself may contain suitable containers (for example, paper cups) to be given to the user.

In one set of embodiments, the device may be one that is able to create a beverage by mixing a composition, such as described herein, with water or another liquid. The device may mix the composition with water to produce the beverage, e.g., to be dispensed by a suitable dispenser, such as a nozzle.

Any source of water may be used by the device. For example, for water, the device in various embodiments may include a reservoir therein containing water (which may, for example, be fillable by a user), or be connected to an external source of water, e.g., a plumbing line.

The device may also contain a compartment suitable for containing a composition, e.g., including any of the ones described herein. Upon command, the device may mix water and the composition together, e.g., to produce a beverage that is dispensable, for example, to a cup or other container provided by the device or by the user, etc. The mixing may occur within the device, or external to the device in some cases (for example, within the cup or other suitable container).

In one set of embodiments, the composition may be provided by the user. For example, the composition may be provided as separate packages or assemblies, which may be may be individually or collectively sealed. One or more packages may be added to the device, e.g., inserted by a user. In one embodiment, this may function similarly to a common coffee machine.

In addition, in certain embodiments, the device may be able to contain a plurality of compositions, e.g., as described herein. For example, a user may be able to select one of a plurality of beverages, and in some cases, a mixture of two or more of those beverages. For example, the device may contain a plurality of compositions such that the user can select a single type of beverage, or a mixed drink comprising more than one type of beverage. In one embodiment, the device can accordingly function as a "bartender" device that allows a user to select any of a wide variety of beverages, e.g., alcoholic beverages and cocktails, that are produced by the device by using suitable compositions and/or mixtures of compositions.

In some cases, the device may also contain a source of ice. For example, the device may contain a reservoir that is to be filled with ice (e.g., by a user), or the device may be able to create ice, for example, by freezing water from a source of water (e.g., a reservoir containing water or an external source of water, etc.). The device, in certain embodiments, may mix the ice with the composition to produce the beverage. In some cases, liquid water may also be added.

U.S. Provisional Patent Application Ser. No. 63/046,339, filed Jun. 30, 2020, entitled "Systems and Methods for Creating Beverages," is incorporated herein by reference in its entirety.

The following examples are intended to illustrate certain embodiments of the present disclosure, but do not exemplify the full scope of the disclosure.

Example 1

In this example, a series of ice cubes comprising food coloring, carboxylate agarose gel, and cognac extract or rum extract was used to prepare mixed drinks. These used CA 60 and CA 93, an alcohol spirit, and food coloring, using procedures such as those described below. The ice cubes were prepared by mixing the cognac extract or rum extract with carboxylate agarose gel and water at an elevated temperature, then freezing the mixture in an ice cube tray.

Food coloring was also added and frozen onto the ice cubes to form a colored layer. In this experiment, these were added separately to produce an aesthetic appearance, although it should be understood that it is not required to freeze the food coloring separately; the food coloring may be mixed with the other ingredients, or in some cases, no food coloring may be used. A photograph of the ice cubes may be seen in FIG. 1.

From top to bottom, the rows are:

Row 1: Compositions of CA80 and CA 93 in a 1:1 mass ratio and a total concentration of 0.5% w/v infused with cognac and red/orange food coloring.

Row 2: Compositions of CA80 and CA 93 in a 1:1 mass ratio and a total concentration of 0.5% w/v infused with rum and green food coloring.

Row 3: Compositions of CA80 at 0.2% w/v infused with cognac and red/orange food coloring.

Row 4: Compositions with two layers of gels, a bottom gel layer (CA80) infused with cognac and red/orange color, and a top gel layer (CA93) infused with rum and green food coloring.

Row 5: Compositions of CA80 at 0.2% w/v infused with cognac and red/orange food coloring.

Row 6: Compositions of CA80 at 0.5% w/v infused with cognac, rum, and green food coloring.

Example 2

The compositions described in Example 1 were used to prepare drinks in this example. Ice cubes were put in a common glass tumbler with the respective compositions, and ordinary drinking mineral water was added. The drink was stirred vigorously for a few minutes within the glass, allowing the alcohol, flavoring, and food coloring to dissolve together to produce a cocktail beverage.

In another experiment, the ice cubes and water were mixed inside a common cocktail shaker to produce the cocktail beverage. Photographs of this experiment are shown in FIGS. 2A-2E. In FIG. 2A, ice cubes are added to a glass. In FIG. 2B, compositions such as those described in Example 1 are added to the glass. This example uses a composition from Row 6, although any compositions described herein could also be used. In FIG. 2C, water is added to the glass (although the compositions, ice cubes, and the water can be added in any order). In FIG. 2D, these are transferred to a cocktail shaker. In FIG. 2E, after shaking, a clear solution containing cognac, rum, and food coloring is obtained. It should be understood that this is presented by way of example only, and other methods of preparation may be used in other embodiments.

Example 3

The gel formulation described in these examples comprised carboxylated agarose with various degrees of carboxylation. In this example, these are denoted as CAXX, where XX represents the percentage of carboxylation. These ranged widely in these examples from 28% to 93%. Additionally, the gel can also contain other polysaccharides such as alginic acid, kappa-carrageenan, carboxylated kappa-carrageenan, sulfated agarose, phosphorylated agarose, gelatin, etc. The following are various non-limiting examples of gels:

Gel A: A gel comprising CA80 at 0.1% to 1.0% (w/v). For example, the gel may have 0.1% to 0.5% (w/v) of CA80.

Gel B: A gel comprising a mixture of CA80 and CA93 (referred to as CA80/CA93). The ratio of these may range from 1% to 99%, with a total weight percentage of CA80 and CA93 in the gel ranging from 0.1% to 1.0% (w/v). For example, the gel may have 0.1% to 0.5% w/v of CA80/CA93.

Gel C: A gel comprising CA60 and CA93 (referred to as CA60/CA93). The ratio of these may range 1% to 99%, with a total weight percentage of CA60 and CA93 in the gel ranging from 0.1% to 1% (w/v). For example, the gel may have 0.1% to 0.5% w/v of CA60/CA93. Other examples of gels are also possible besides these.

Example 4

This example illustrates a process for making a composition, in one embodiment. In one process, a carboxylated agarose is dissolved in hot water (for example at 95° C. or 80° C.). The carboxylated agarose may be present at a desired concentration. In some cases, the water may be stirred, e.g., until a clear solution is obtained.

The solution may be cooled below the boiling point of ethanol (78.37° C. or 173.1° F.). An ethanol-containing solution can be added. In some cases, other ingredients, such as food coloring, flavoring agents, fragrances, aromas, etc. can be added. The solution may be poured into a mold (e.g., an ice tray) to generated gels of a desired shape.

In one variation of this process, ice is pre-formed in a mold, and the solution is poured onto the ice surface, then cooled rapidly. For example, this may be achieved by placing the mold in a refrigerator or freezer). In some cases, several layers of the gel can be constructed, e.g., through sequential formation of layers of the same or varying composition. As non-limiting examples, constructs such as gel-ice-gel, ice-gel-ice, gel-gel-gel, gel-ice-gel-gel, etc. may be obtained.

Example 5

This example illustrates a process for producing an alcoholic beverage, in one embodiment. A composition is placed or introduced into a suitable mechanical agitator (such as cocktail shaker, drink mixer, etc.). Other gadgets commonly used and familiar to those of ordinary skill in the art, e.g., of making mixed drinks, may be used in some cases. In some cases, the composition may include additional ingredients such as ice cubes or crushed ice, and/or glass and/or plastic beads or spheres, and/or water, and/or other liquids to break up, disperse and/or partially dissolve the gel upon which the contents of the gel are released in the medium to yield an alcohol containing concoction. After suitable mixing or agitation, an alcoholic beverage can be obtained.

Example 6

This non-limiting example illustrates certain processes of producing a beverage containing carbonation and color. A composition of a gel comprising a layer of sodium bicarbonate (FIG. 3A) was introduced into tap water, placed in a suitable container, then mechanically agitated. Next, a gel containing an organic acid such as vinegar was added. In some cases, organic acid may be added to the mixture. When color is desired, a containing gel containing food coloring may be added. The mixture was then agitated to initiate the production of carbon dioxide gas.

The specific formulations tested in this example were as follows. These are also described in FIG. 3B.

Formulation 1: 1 w/v % CA 80

Formulation 2: 1 w/v % of total CA (90% CA 80 and 10% CA 93)

Formulation 3: 0.5 w/v % CA 80

FIG. 4 illustrates images from non-limiting examples showing the generation of carbonation. In particular, FIG.

4A shows a glass of tap water following addition of gel comprising of blue food color as described in gel shown in Column 1-Row 3, and then a gel containing a layer of sodium bicarbonate ($NaHCO_3$) as described in gel shown in Column 1-Row 2, followed by the addition of gel comprising vinegar as described in gel shown in Column 2-Row 1.

Figures 4A, 4B, 4C, 4D, 4E, 4F, 4G, 4H, 4I, 4J:
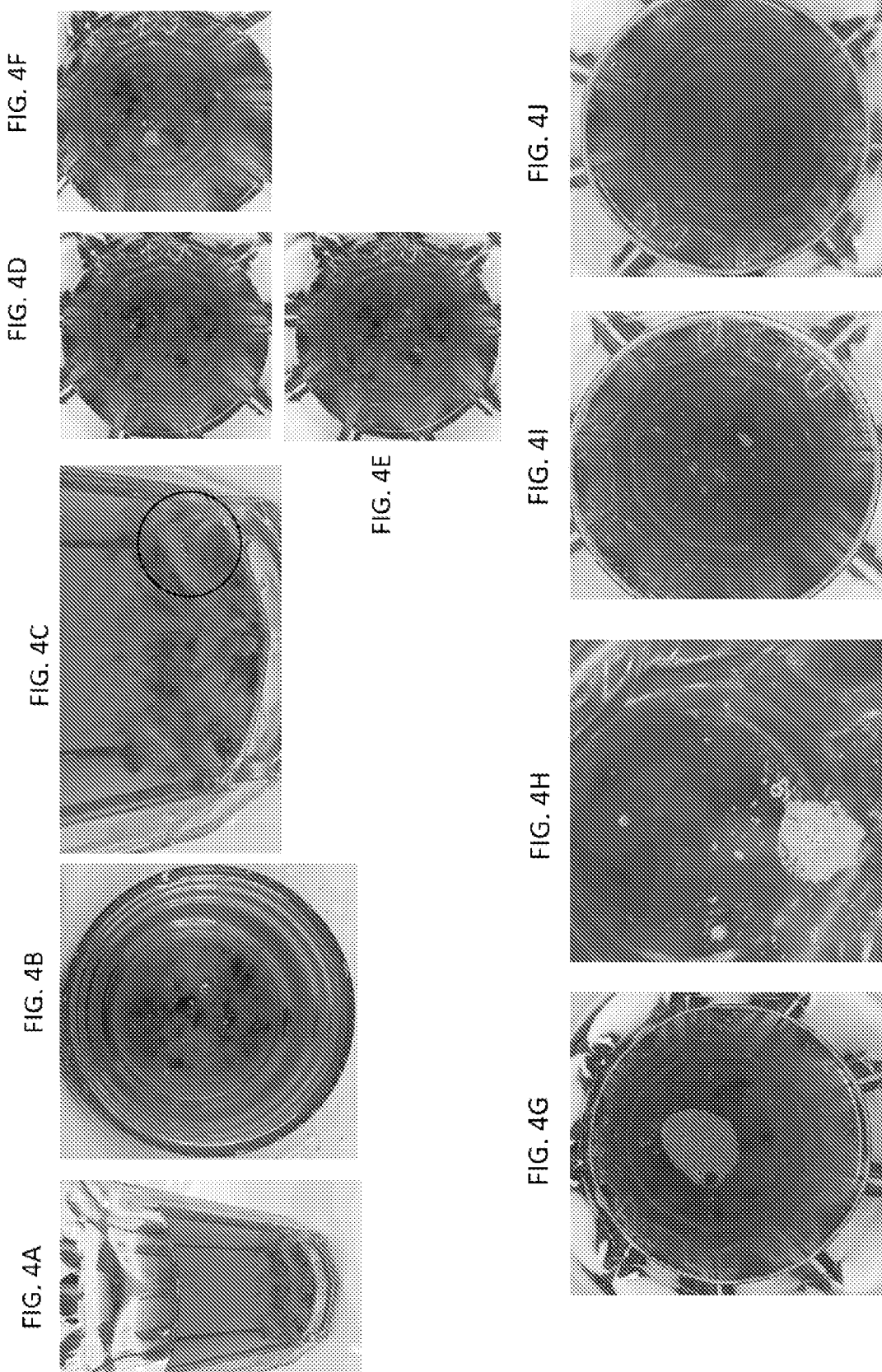
FIGS. 4A-4J illustrates a beverage containing carbon dioxide bubbles, according to still another embodiment.

FIG. 4B is an image showing the generation of carbon dioxide in the gel after 5 min after implementation of the process detailed above with reference to FIG. 4A. FIG. 4C is an image showing the evolution of carbon dioxide in the gel within the sodium bicarbonate layer highlighted using the circle.

FIGS. 4D and 4E are images showing the continued generation of carbon dioxide in the gel after 10 min after implementation of process detailed above with reference to FIG. 4A. FIGS. 4F-4J are images showing the generation of carbon dioxide in the gel after 15 min (FIG. 4F), 30 min (FIG. 4G), 60 min (FIG. 4H), 90 min (FIG. 4I), and 210 min (FIG. 4J) after implementation of the process detailed above with reference to FIG. 4A.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition, comprising:
an edible gel and a beverage precursor, wherein the edible gel comprises carboxylate agarose, and the beverage precursor comprises ethyl alcohol.

2. The composition of claim 1, wherein the composition, when mixed with water, forms a beverage.

3. The composition of claim 1, wherein the beverage precursor comprises a beverage extract.

4. The composition of claim 1, wherein the beverage precursor comprises dehydrated extract of vodka, baijiu, shochu, soju, gin, rum, tequila, mezcal, and/or whisky.

5. The composition of claim 1, wherein the beverage precursor comprises dehydrated extract of a cocktail.

6. The composition of claim 1, wherein the beverage precursor comprises dehydrated extract of apple, beet, blackberry, cantaloupe, carrot, celery, cherry, cranberry, coconut, cucumber, grape, grapefruit, guava, honeydew, kiwi fruit, lemon, lime, orange, papaya, passionfruit, parsley, pineapple, pomegranate, prune, raspberry, strawberry, sugarcane, tomato, turnip, watercress, and/or winter melon.

7. The composition of claim 1, wherein the beverage precursor comprises a sugar.

8. The composition of claim 1, wherein the beverage precursor comprises artificial sweetener.

9. The composition of claim 1, wherein the beverage precursor comprises food coloring.

10. The composition of claim 1, wherein the beverage precursor comprises annatto, caramel, carmine, elderberry juice, lycopene, paprika, and/or turmeric.

11. The composition of claim 1, wherein the beverage precursor comprises flavoring.

12. The composition of claim 1, wherein the beverage precursor comprises fragrance.

13. The composition of claim 1, wherein the composition comprises a gas-forming agent.

14. A method, comprising:
adding water to a composition comprising (a) carboxylate agarose, (b) a beverage precursor comprising ethyl alcohol.

15. A method, comprising:
providing a container comprising water and a plurality of edible gel particles having an average diameter of at least 0.5 cm, the edible gel particles comprising carboxylate agarose and ethyl alcohol; and
stirring the water in the container until the edible gel particles have an average diameter of less than 1 mm.

16. The method of claim 15, wherein the plurality of edible gel particles further comprises a beverage precursor.

17. The composition of claim 1, wherein the edible gel further comprises ice.

18. The method of claim 14, wherein the composition further comprises ice.

* * * * *